United States Patent [19]
Atwood

[11] Patent Number: 5,395,229
[45] Date of Patent: Mar. 7, 1995

[54] BELT SHIELD FOR BAGEL FORMING BELT

[75] Inventor: Thomas A. Atwood, Dolton, Ill.

[73] Assignee: AM Manufacturing Company, Dolton, Ill.

[21] Appl. No.: 118,636

[22] Filed: Sep. 10, 1993

Related U.S. Application Data

[63] Continuation-in-part of Ser. No. 50,824, Apr. 21, 1993, abandoned.

[51] Int. Cl.⁶ .............................................. A21C 11/00
[52] U.S. Cl. .................. 425/364 B; 264/310; 264/316; 425/403; 426/499; 426/514
[58] Field of Search ............... 425/329, 364 B, 403, 425/287, 288; 264/294, 310, 313, 316; 426/496, 499, 512, 514

[56] References Cited

U.S. PATENT DOCUMENTS

| | | | |
|---|---|---|---|
| 1,552,430 | 9/1925 | Gendler | 425/364 B |
| 3,407,754 | 10/1968 | Wichinsky | 425/364 B |
| 3,799,726 | 3/1974 | Lugo | 425/364 B |
| 3,802,824 | 4/1974 | Amster et al. | 425/364 B |
| 3,880,567 | 4/1975 | Raichel | 425/364 B |
| 4,076,480 | 2/1978 | Marano | 425/364 B |

FOREIGN PATENT DOCUMENTS 239890 3/1969 U.S.S.R. ............................ 425/364 B

*Primary Examiner*—Jay H. Woo
*Assistant Examiner*—Joseph Leyson
*Attorney, Agent, or Firm*—Hill, Steadman & Simpson

[57] ABSTRACT

A dough shield is disclosed for an apparatus for forming and rolling dough into ring-shaped pieces such as bagels. The apparatus has a flat conveyor belt wrapped into a forming tube having a V-shaped notch. The dough shield extends upward at a leading end thereof from said notch and downward at a trailing end inside the forming tube. The dough shield has a dough guiding surface which prevents excess dough from leaving the confines of the wrapped belt and forming tube and clogging up and fouling the equipment. In another embodiment, the shield is arranged between the tube and the belt along its length. The dough shield is ogive-shaped in plan view and concave downward in a vertical plane. The shield is provided with an adjustment bracket for adjusting the vertical height of the shield with respect to the forming tube and mandrel.

19 Claims, 5 Drawing Sheets

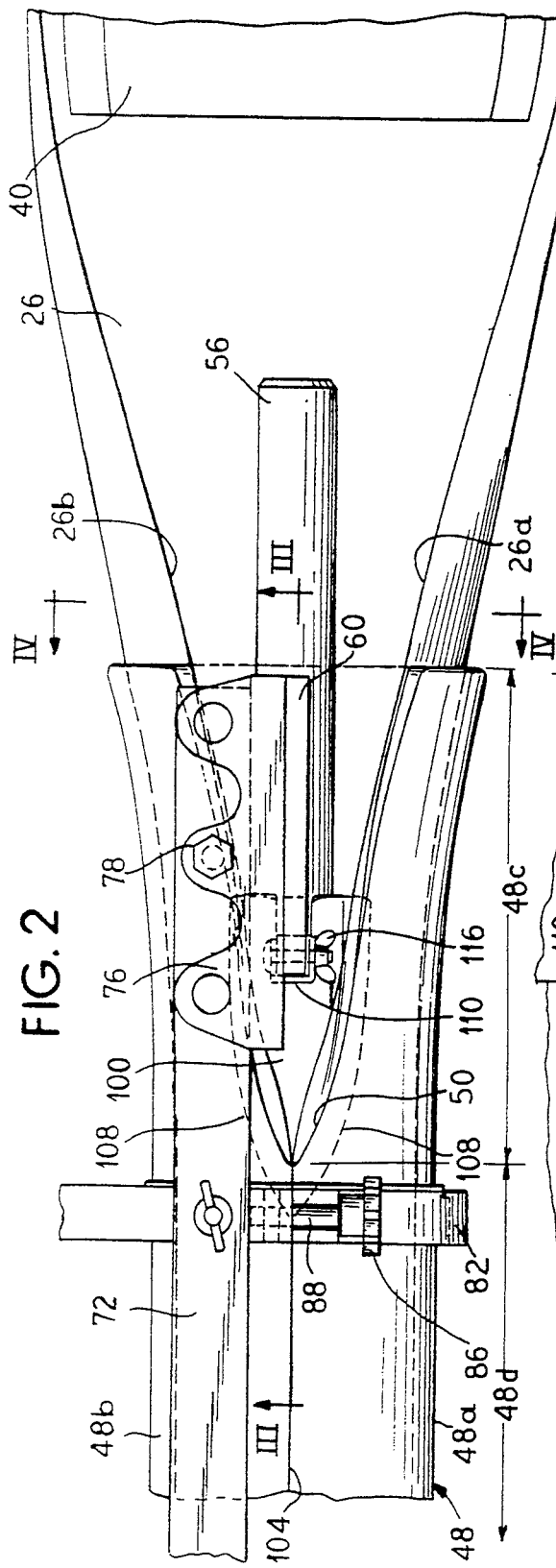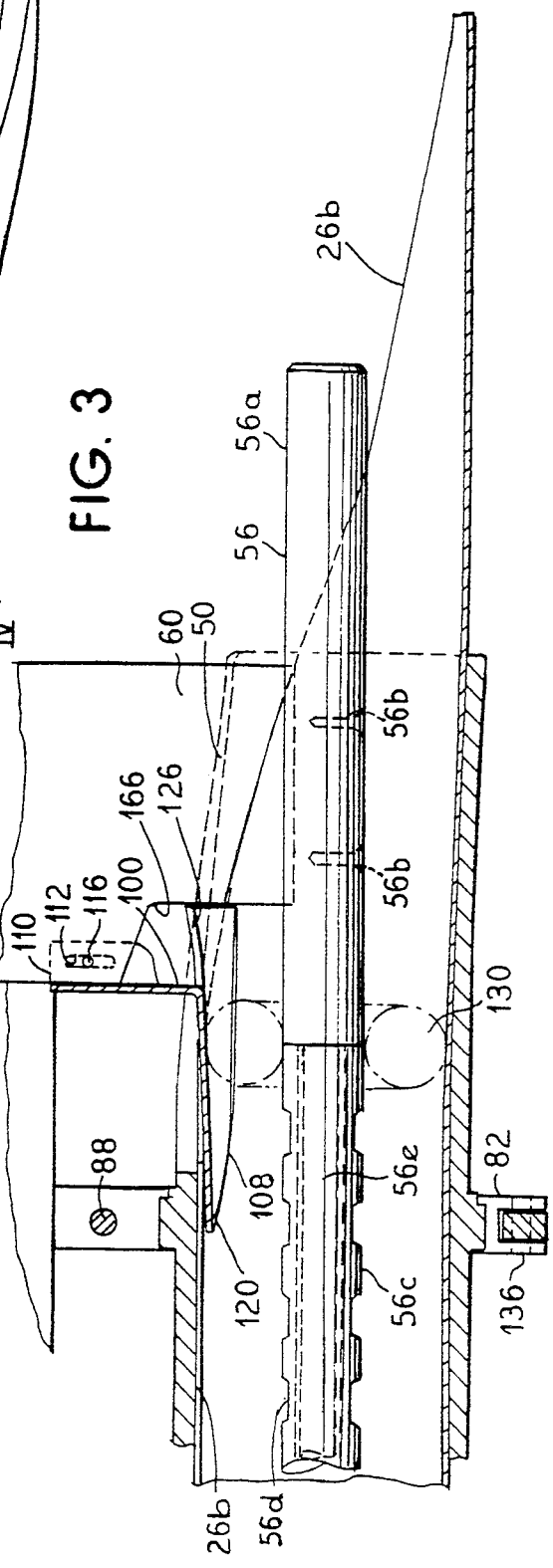

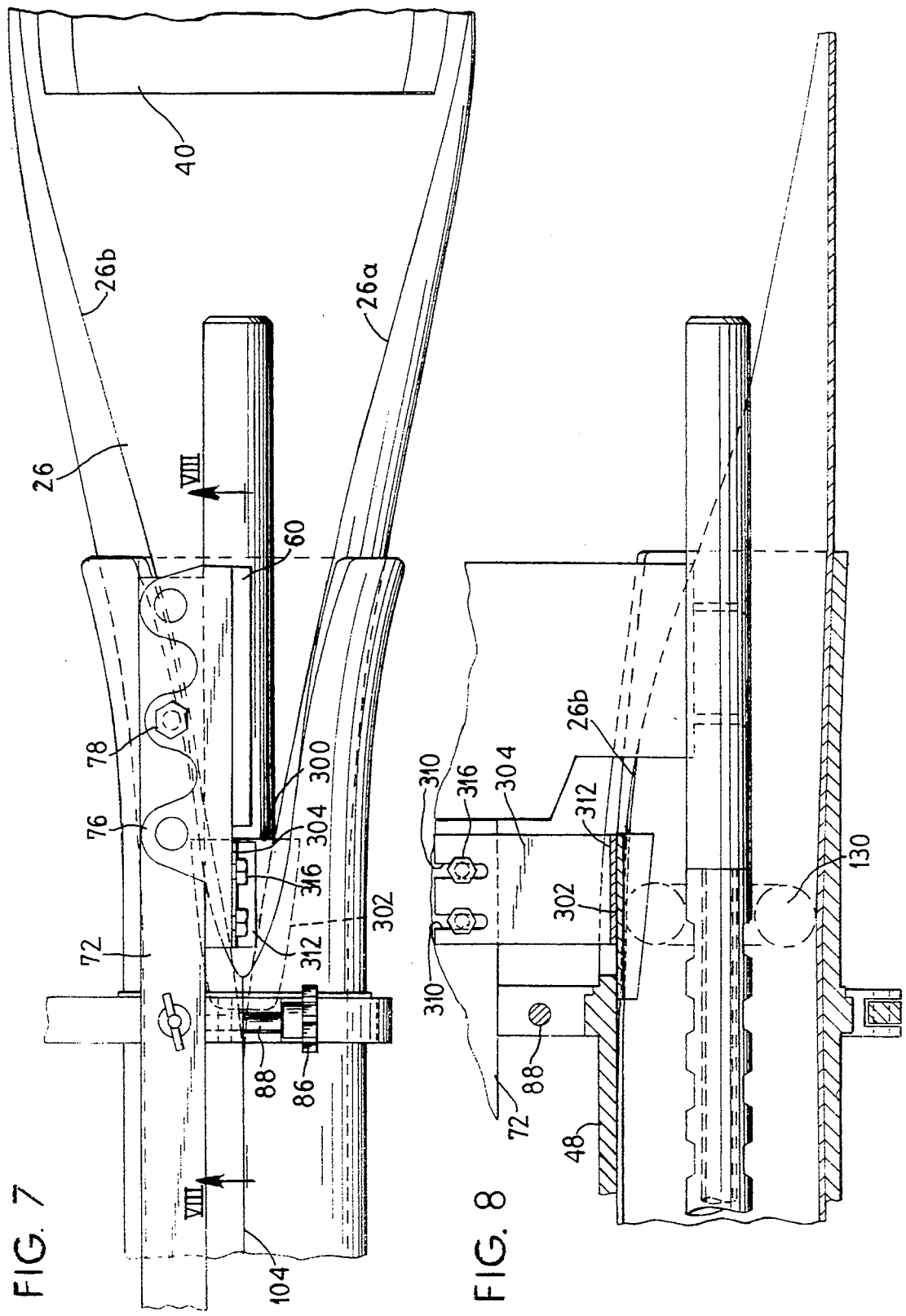

BELT SHIELD FOR BAGEL FORMING BELT

This application is a continuation-in-part of U.S. Ser. No. 08/050,824, filed Apr. 21, 1993, now abandoned.

BACKGROUND OF THE INVENTION

This invention relates to a dough forming machine, and in particular to a bagel dividing and forming machine which forms circular rolls such as bagels. The invention provides an improvement to such machines.

Machines for dividing and forming bagels are known. In such a known machine, a motor driven circulating looped belt is provided with a horizontal top surface. The belt is wrapped around an idler drum and a drive drum. At a first end of the machine, a pressure plate having a downward arcuate surface toward the belt is provided slightly elevated from the top surface of the belt. A dough guide plate is provided upstream of the pressure plate. When an incremental amount of dough is placed onto the belt, the belt carries the dough beneath the pressure plate which causes the incremental amount to roll and elongate into a solid cylinder shape. At approximately the mid-span of the top surface of the belt is arranged a forming tube having an inside diameter approximating the outside diameter of the desired bagel shape. The forming tube has a V-shaped cut-out at a top side thereof. A mandrel with an outside diameter approximating the diameter of the central hole of the bagel is mounted axially through the forming tube.

The lateral edges of the belt are wrapped upward into a circular shape corresponding to the inside diameter of the forming tube, guided into the forming tube by the V-shaped notch, the belt passing through the forming tube while in the circular shape and once exiting the forming tube, the belt flattens back down into a flat horizontal profile. Before returning to the first end of the assembly, the belt extends above a rotary table for receiving the finished product which drops off the belt. The rotary table could also be a further belt or other product receiving station.

The forming tube typically comprises two half circular sections with a seam located on a top side of the tube. The tube also provides a V-shaped notch at the top at the upstream axial end thereof. The V-shaped notch guides the lateral edges into the circular shape to pass into the forming tube.

It has been a problem in the prior art that the length of the solid cylinder dough piece arriving at the forming tube within the wrapped belt exceeds a width of the belt. As the lateral edges of the belt are brought together, as the belt proceeds into the tube, the excess length of dough can extend beyond the edges of the belt and be pinched off outside of the belt. This may cause the dough to foul the seam between the two circular sections of the tube. Excess dough can also actually be drawn onto an underside of the belt between the belt and the forming tube which presents a clogging problem as well as an overall machine tidiness problem as the dough proceeding on the underside of the belt can foul the idler drum and the drive drum for the belt.

It is known to fixedly fasten an arcuate shield piece to partially cover a central area of the V-shaped notch and to guide excess dough into the circle formed by the belt wrapped into the tube. However, such a shield piece has been fixed to the mandrel, not allowing quick change out or position adjustment.

SUMMARY OF THE INVENTION

It is an object of the present invention to provide an improved rolled dough forming machine which eliminates the drawbacks of prior art devices. In particular, the improved machine of the present invention provides a shield upstream of the forming tube which prevents excess dough from proceeding outwardly of an inside surface of the wrapped belt within the forming tube.

In the improvement of the present invention, a dough shield is installed upstream of and within the forming tube, proximate to the V-shaped notch, the shield directing dough downward into the interior of the forming tube. The front profile of the shield is approximately arcuate with its edges extending below lateral edges of the forming belt as the belt is wrapped within the tube. The shield prevents dough from entering the seam where the forming tube halves are locked together and also prevents dough from forming on the edge of the belt and proceeding between the belt and the tube and fouling a back side of the belt. The shield makes the belt effectively self-cleaning. Additionally, the shield prevents excess dough from fouling the drive pulley or the idler pulley of the belt system.

In another improvement of the present invention, a dough shield is installed upstream of and within the forming tube, proximate to the V-shaped notch, the shield directing dough downward into the interior of the forming tube. The front profile of the shield is approximately arcuate with its edges extending above lateral edges of the forming belt as the belt is wrapped within the tube. The shield compresses the lateral edges of the forming belt downwardly to prevent dough from entering the seam where the forming tube halves are locked together and also prevents dough from forming on the edge of the belt and proceeding between the belt and the tube and fouling a backside of the belt. The shield makes the belt self cleaning and prevents excess dough from fouling the drive pulley or the idler pulley of the belt system.

The dough shield according to the present invention is adapted and arranged to be quickly and easily disassembled from the forming tube and mandrel assembly. The dough shield provides a position adjusting means to allow for adjusting the location of the shield for different sized forming tubes and mandrels as well as fine tuning position adjustment.

BRIEF DESCRIPTION OF THE DRAWINGS

FIG. 2 is a partial top plan view of the apparatus of FIG. 1;

FIG. 3 is a sectional view taken generally along III—III from FIG. 2;

FIG. 7 is a partial top plan view of an alternate embodiment of the present invention; and FIG. 8 is a sectional view taken generally along VIII—VIII from FIG. 7.

DETAILED DESCRIPTION OF THE PREFERRED EMBODIMENTS

Figure 1:
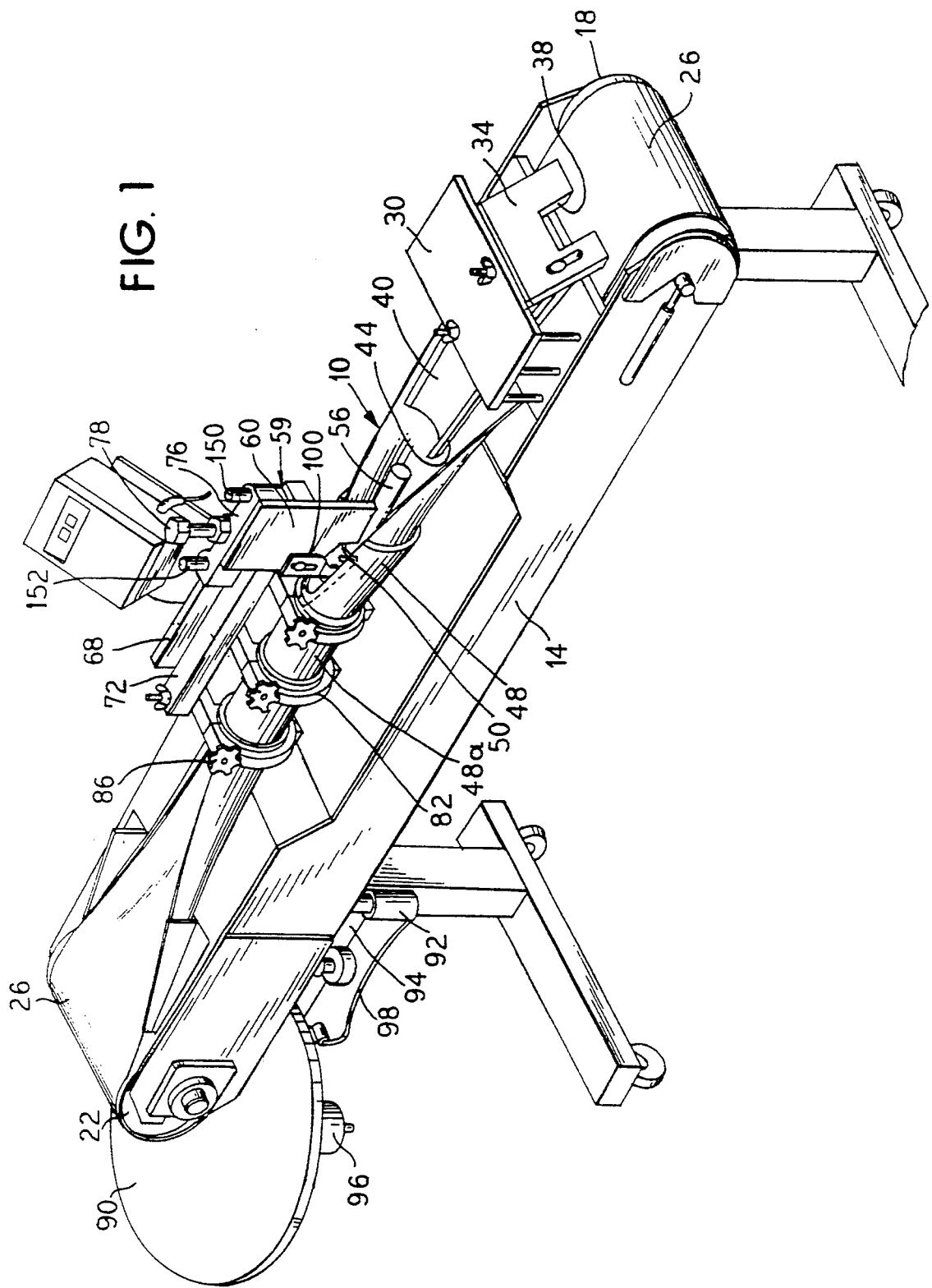
FIG. 1 is a perspective view of the apparatus of the present invention.

FIG. 1 illustrates a dough forming machine 10 having a frame 14 rotatively holding a drive drum 22 at one end thereof and an idler drum 18 at an opposite end thereof. Wrapped around the drive drum 22 and the idler drum 18 is a continuous belt 26. The drive drum 22 is driven by a motor (not shown). At a first end adjacent the idler drum 18 is a dough guide bracket 30 which mounts a dough guide 34 having a window 38 for placing incremental amounts of dough. Dough placed in the window 38 is drawn by the belt 26 under a pressure plate 40 having an arcuate bottom surface 44.

Central of the belt 26 is a forming tube 48. The belt 26 is wrapped into an approximate circular shape by being threaded through the forming tube 48. The forming tube 48 comprises left and right semicircular sections 48a, 48b split at a top and bottom of the forming tube 48. The forming tube 48 provides a V-shaped notch 50 at a top side thereof facing the pressure plate 40. Located axially within the forming tube 48 is a mandrel 56 which is a cylindrical elongate member.

The forming tube 48 and the mandrel 56 are supported from a stationary frame 59 as is well known in the art. Particularly, the mandrel 56 is supported by a mandrel support 60 which protrudes upwardly through the V notch 50.

The sections 48a, 48b of the forming tube 48 are supported by an assembly mount plate 68. Connected to the mount plate 68 is a mandrel mount bar 72 which is adjustably connected to a mandrel adjusting block 76. The adjusting block 76 holds a vertical adjusting screw 78 for raising and lowering the adjusting block 76 with respect to the mount bar 72. The adjusting block 76 is connected to, or integral with, the mandrel support 60 hence the mandrel 56 can be positionally adjusted with respect to the forming tube 48. The forming tube is held with respect to the assembly mount plate by three split and hinged forming tube clamps 82 openable by removing star knobs 86 which are threaded onto connecting studs 88 shown in FIG. 2.

At a discharge end of the belt 26, mounted below the belt, is a rotary table or carousel 90 for receiving the formed circular dough shapes for further processing, packing, or baking. The carousel 90 is mounted via a swivel mount 92 and a swing arm 94 proceeding from the swivel mount 92. A motor 96 drives the carousel and is fed via a power cord 98. A different receiving station could be utilized such as an additional belt or box or other such means for receiving the formed dough.

Adjustably mounted to the mandrel support 60 is a dough shield 100. The dough shield 100 is described in more detail below.

FIG. 2 shows the forming tube 48 comprising the left section 48a and the right section 48b having a top connection interface or seam 104. An inlet region 48c has the notch 50 through a top side thereof and a cylindrical region 48d is arranged adjacent thereto. The belt 26 is shown with edges 26a, 26b being wrapped into close proximity within the tube 48 forming a generally circular cross section. The dough shield 100 comprises an anvil-shaped or ogive-shaped perimeter 108, has a downwardly concave shaped cross section, and tilts downwardly to have a rear portion located below the edges 26a, 26b when those edges are brought together within the forming tube 48, shown in FIG. 3. The shield 100 provides a vertically arranged channel shaped lug 110 having opposing slots 112, 113 (shown in FIGS. 3 and 5) for holding a bolt and wing nut assembly 116 therethrough for adjusting the vertical position of the shield 100 with respect to the mandrel support 60.

FIG. 3 shows the shield 100 being arranged tipped downwardly toward a rear end 120 thereof below the edge 26b of the belt 26. At a front end of the shield 100, a guide surface 126 is provided which forces excess dough downwardly and inwardly of the belt 26 as dough proceeds toward and against the shield 100. Across a width of the shield 100 opposite sides of the shield curve downwardly and taper inwardly in a belt translation direction as shown more clearly in FIGS. 4 and 5. The guiding surface 126 acts to "shoehorn" the dough into the inside diameter of the belt 26 defined by the diameter of the forming tube 48. The guiding surface can be fashioned having a decreasing radius arcuate cross section from front to back terminating in a radius approximately equal to the inside radius of the wrapped belt 26 within the tube 48. A bagel or rolled dough form 130 is shown in FIG. 3 passing past the shield 100.

FIG. 3 shows the stud 88 which closes the clamp 82, and also shows a bottom pinned connection 136 for providing the hinge for opening the clamp 82. The mandrel 56 can comprise a multipiece assembly including a mandrel adaptor rod 56a having screws 56b for attaching to the support 60, and a mandrel sleeve 56c having an irregular surface 56d. The mandrel adaptor rod 56a has an extending core 56e onto which the sleeve 56c is mounted. The sleeve 56c as well as the forming tube 48 can be replaced with sleeves and forming tubes of different diameters for making different sized and shaped products.

Figure 4:
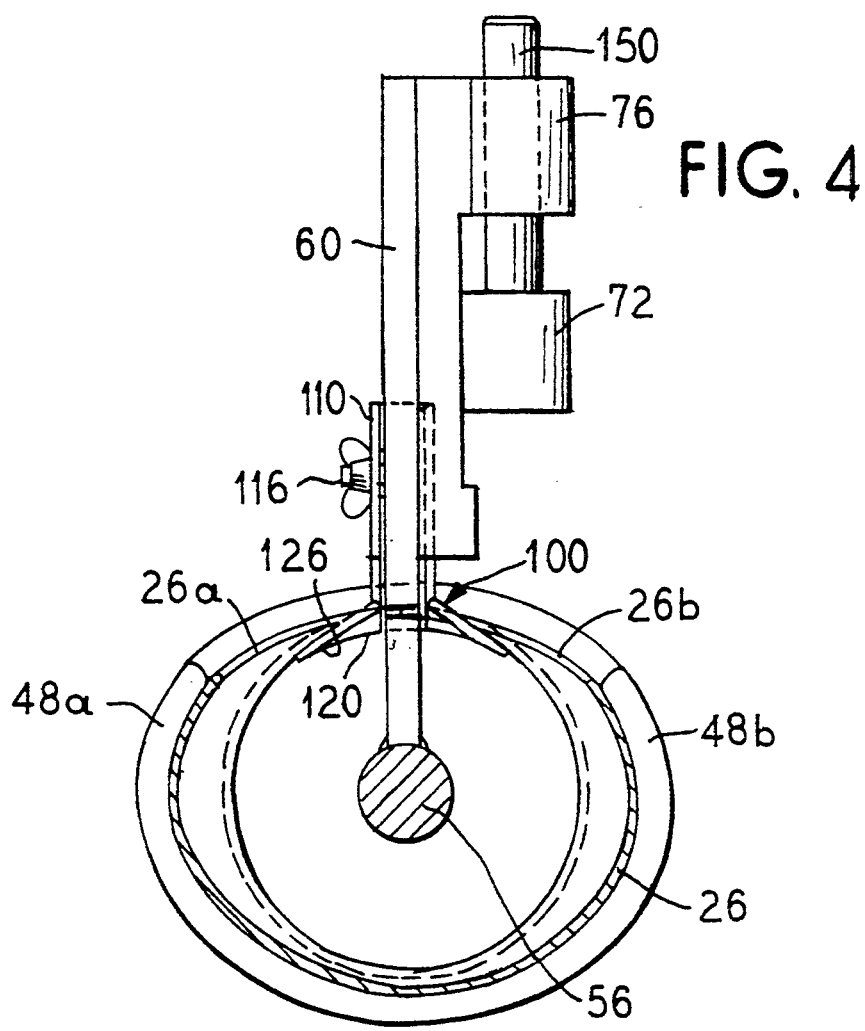
FIG. 4 is a sectional view taken generally along line IV—IV from FIG. 2.

FIG. 4 shows a front end view of the shield 100 clamped to the mandrel support 60. The rear end 120 is seen having a lower elevation than the top of the guiding surface 126. The mandrel support block 76 is pinned to the mandrel mount bar 72 to allow for guided vertical movement therebetween, by two pins 150, 152 (shown in FIG. 1).

Figure 5:
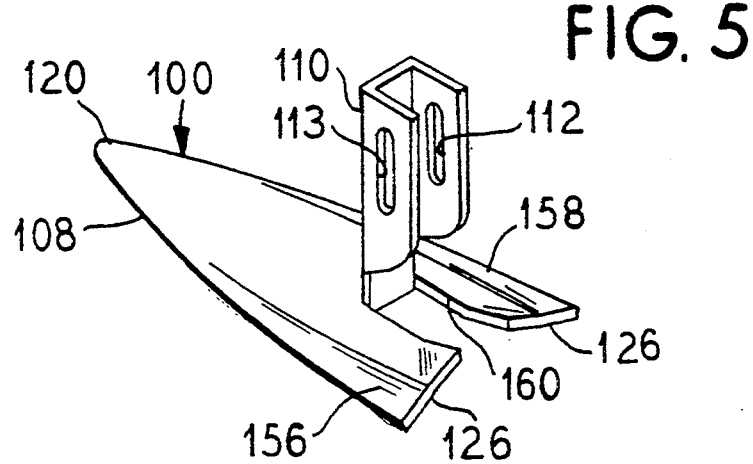
FIG. 5 is a perspective view of a dough shield of the present invention.

FIG. 5 shows the shield 100 having the anvil or ogive shape profile 108. The guiding surface 126 extend from front finned portions 156, 158. A notch 160 is provided between the fin portions 156, 158 for interfitting closely with a mandrel support. Although the shown mandrel support 60 has a corner notch 166 (see FIG. 3) which clears the fin portions 156, 158, the notch 160 makes mounting the shield 100 to a support without a corner notch possible for a closer fit between the shield 100 and the support 60. The channel-shaped bracket 110 extends upward from the fin portions 156, 158. This bracket 110 can be bent off using material removed from the notch 160, or can be attached thereto by known methods.

Figure 6:
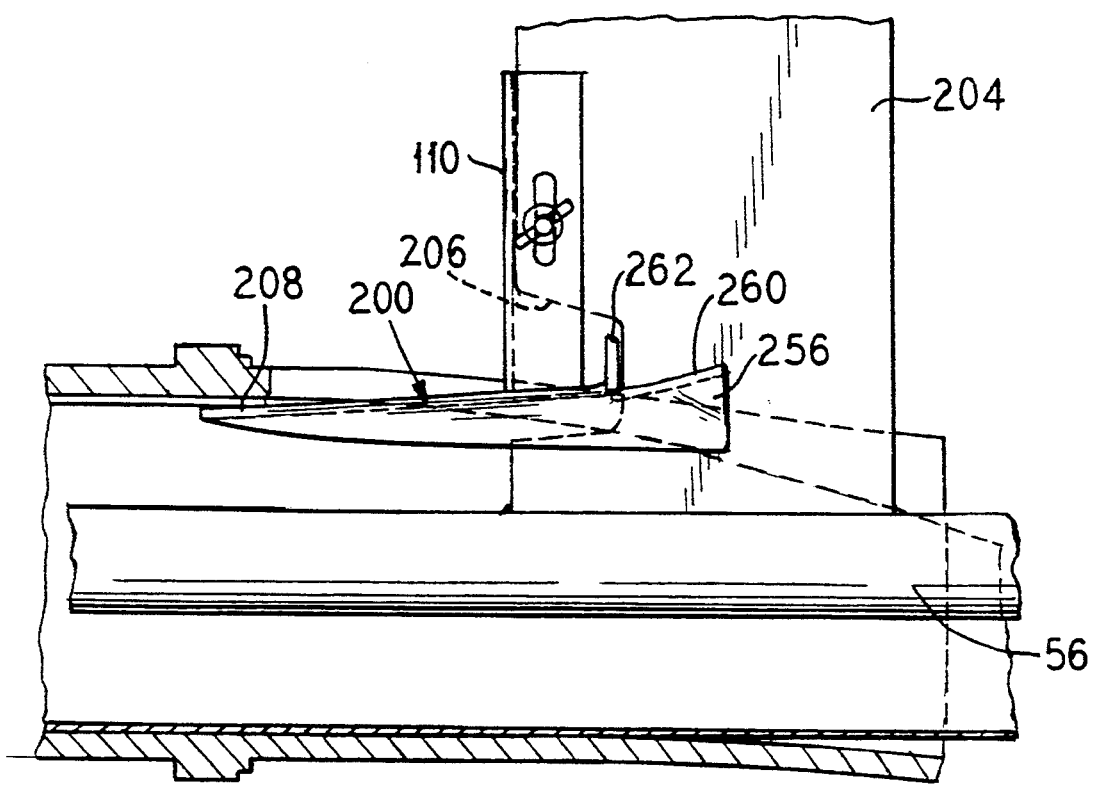
FIG. 6 is a partial elevational view of an alternate embodiment of the apparatus of the present invention.

FIG. 6 illustrates an alternate embodiment of the shield, alternate shield 200, attached to an alternate mandrel support 204. The alternate mandrel support 204 comprises a notch 206 on a side facing the shield 200. The shield 200 provides an identical configured anvil-shaped profile 208 as previously described. At a front end, wing portions 256, 258 are provided with a notch 260 therebetween. Material removed to provide for the notch 260 is bent upwardly to form a tab 262. The notch 260 is sized to allow a thickness of the support 204 to tightly interfit therein when the shield 200 is attached to the support 204. The tab 262 fits tightly up against the support 204. The shield 200 provides an identical channel-shaped bracket 110 as described previously. In this configuration, the shield 200 fits more closely and tightly up against the support 204 to inhibit any excess dough from escaping the confines of the shield 200 and an interior of the belt 26 as it is wrapped to pass into the forming tube 48.

FIGS. 7 and 8 illustrate an alternate embodiment of the apparatus of FIG. 2 with like parts indicated with like identifiers. Unlike the embodiment of FIG. 2, a shield 300 provides a body 302 installed between the forming tube 48 and the lateral edges 26a, 26b of the belt, slightly compressing the edges downwardly. The body 302 is attached to a bracket 304 which is adjustable with respect to the mandrel mount bar 72. The bracket is vertically adjusted via a pair of slots 310 receiving bolts 316 which screw into the mandrel mount bar 72 and fix the bracket at the select orientation. The body 302 is shaped as an equiangular trapezoid with an arcuate cross section taken perpendicularly to the mandrel axis. The bracket 304 has a bottom flange 312 for connection to the body 302. As an alternative to the bolts 316, studs with wing nuts or other appropriate connectors can be used. In this embodiment, the compressed lateral edges 26a, 26b under influence of the body 302 act to retain dough pieces 130 within the confines of the belt.

Although the present invention has been described with reference to a specific embodiment, those of skill in the art will recognize that changes may be made thereto without departing from the scope and spirit of the invention as set forth in the appended claims.

I claim as my invention:

1. In a dough roll forming machine having a flat circulating belt with lateral edges and having a region wherein the belt is wrapped upwardly into a circular cross section and threaded through a forming tube, said belt translating in a longitudinal direction through said tube, said tube having a V-shaped notch formed through a top portion of said forming tube at a front end of said tube whereat said belt is entering said tube, said V-shaped notch guiding said lateral edges of said belt upwardly into said circular cross section for interfitting into said forming tube, and an elongate cylindrical mandrel located axially through said forming tube and held thereat by a means for holding said mandrel, the improvement comprising:
   a stationary dough shield arranged vertically adjacent to both said lateral edges of said belt in said region and below said top portion of said forming tube and located partially underlying said V-shaped notch; and
   said dough shield having a means for adjustably positioning said dough shield with respect to said V-shaped notch of said forming tube.

2. The improvement according to claim 1, wherein said dough shield is arranged above said lateral edges in said region.

3. The improvement according to claim 1, wherein said dough shield is curved downwardly toward opposite lateral sides of said shield.

4. The improvement according to claim 1, wherein said means for adjustably positioning comprises a shield bracket having multiple attachment locations for mounting said shield in adjustable position to said means for holding said mandrel.

5. The improvement according to claim 4, wherein said means for holding said mandrel comprises a mandrel mount bar, and said shield bracket is mounted to said mandrel mount bar.

6. The improvement according to claim 1, wherein said shield has an inwardly tapering lateral width in a direction of belt translation through said tube.

7. The improvement according to claim 1, wherein said dough shield is arranged below said lateral edges in said region.

8. The improvement according to claim 7, wherein said shield has an ogive shape tapering inwardly in a direction of belt translation through the tube.

9. In a machine for forming rolled ring-shaped dough pieces, the machine having a stationary frame and a flat belt circulating around two drums, said flat belt in a horizontal orientation on a top side thereof, said flat belt having lateral edges, said flat belt wrapped upwardly and threaded through a forming tube in a wrapped region of the belt, the belt translating longitudinally through said tube from a front end to a rear end thereof and a mandrel mounted fixedly to said frame and axially through said tube, the improvement comprising:
   said forming tube having a belt inlet region with a V-shaped notch through a top thereof at said front end and a cylindrical region having an encircling wall, said cylindrical region adjacent said inlet region;
   a stationary dough shield located at the entry of said belt into said cylindrical region of said forming tube, said dough shield comprising a front portion extending in front of said cylindrical region of said forming tube, a rear portion extending into said cylindrical region of said forming tube, and a belt guiding surface provided between said front portion and said rear portion, said rear portion of said shield arranged between said belt and said encircling wall of said forming tube; and
   a means for adjustably positioning the shield with respect to the forming tube.

10. The improvement according to claim 9, wherein a cross section taken in a lateral direction through said guiding surface is concave downwardly.

11. The improvement according to claim 10, wherein said guiding surface between said front and rear portion is a smooth surface.

12. The improvement according to claim 11, wherein said shield has an inwardly tapering lateral width in the longitudinal direction of belt translation through said tube.

13. The improvement according to claim 10, wherein said means for adjustably positioning comprises a shield mounting bracket extending upwardly from said shield and having a vertically oriented slotted connection hole with a fastener for adjustably securing said shield in fixed vertical position to said frame.

14. The improvement according to claim 10, wherein said means for adjustably positioning comprises a channel shaped lug connected to said shield and having opposed vertical slots, wherein said frame comprises a mandrel support and said mandrel is mounted to said mandrel support, said lug fittable to said mandrel support with a bolt assembly extending through said slots for selective vertical adjustment of said shield with regard to said support.

15. A bagel forming machine comprising:
   a stationary frame;
   a drive drum driven by a motor;
   an idler drum;

a belt wrapped around said drive drum and said idler drum;

a forming tube positioned between said drive drum and said idler drum and surrounding a portion of said belt, said forming tube having an open upstream end with a V-shaped notch causing lateral edges of said belt to curl upwardly forming a substantially circular cross section of said belt as said belt translates longitudinally through said tube;

a mandrel mounted to said frame and positioned axially through said tube;

a dough shield positioned at said upstream open end of said forming tube, said dough shield having an upstream end positioned above said lateral edges of said belt and a downstream end positioned within a circumference of said forming tube above said lateral edges of said belt therein; and means for vertically adjusting the position of said shield with respect to said forming tube.

16. The improvement according to claim 15, wherein said shield is downwardly concave-shaped in cross section in a plane taken perpendicular to an axis of said forming tube.

17. The improvement according to claim 15, wherein said shield has an inwardly tapering lateral width in the longitudinal direction of belt translation through said tube.

18. The improvement according to claim 15, wherein said means for vertically adjusting comprises a shield mounting bracket extending upwardly from said shield and having a vertically oriented slotted connection hole with a fastener for selectively securing said shield in fixed position to said frame.

19. The improvement according to claim 15, wherein said means for vertically adjusting comprises a channel shaped lug connected to said shield and having opposed vertical slots wherein said frame comprises a support, and said mandrel is mounted to said mandrel support, said lug fittable to said mandrel support with a bolt assembly extending through said slots for selective vertical adjustment of said shield with regard to said mandrel support.

* * * * *